(12) United States Patent
Logan et al.

(10) Patent No.: US 11,160,003 B2
(45) Date of Patent: Oct. 26, 2021

(54) CONNECTING TO A WIRELESS NETWORK BASED ON A DEVICE MOBILITY STATE

(71) Applicant: CHARTER COMMUNICATIONS OPERATING, LLC, St. Louis, MO (US)

(72) Inventors: William Kenneth Logan, Overland Park, KS (US); Oliver James Jauncey, Bromley (GB); Stephen Colias, London (GB)

(73) Assignee: Charter Communications Operating, LLC, St. Louis, MO (US)

( * ) Notice: Subject to any disclaimer, the term of this patent is extended or adjusted under 35 U.S.C. 154(b) by 532 days.

(21) Appl. No.: 15/669,151

(22) Filed: Aug. 4, 2017

(65) Prior Publication Data

US 2019/0045417 A1 Feb. 7, 2019

(51) Int. Cl.
| | |
|---|---|
| *H04W 36/32* | (2009.01) |
| *H04W 76/34* | (2018.01) |
| *H04W 76/15* | (2018.01) |
| *H04W 8/02* | (2009.01) |
| *H04W 36/30* | (2009.01) |
| *H04W 4/02* | (2018.01) |
| *H04W 48/16* | (2009.01) |
| *H04W 48/18* | (2009.01) |

(Continued)

(52) U.S. Cl.
CPC .......... *H04W 36/32* (2013.01); *H04W 4/027* (2013.01); *H04W 8/02* (2013.01); *H04W 36/30* (2013.01); *H04W 48/16* (2013.01); *H04W 48/18* (2013.01); *H04W 76/15* (2018.02); *H04W 76/34* (2018.02); *H04W 36/14* (2013.01); *H04W 84/12* (2013.01)

(58) Field of Classification Search
CPC ..... H04W 36/14; H04W 36/30; H04W 36/32; H04W 4/027; H04W 8/02; H04W 76/15; H04W 76/34; H04W 84/12; H04W 48/16; H04W 48/18

See application file for complete search history.

(56) References Cited

U.S. PATENT DOCUMENTS

| | | | | |
|---|---|---|---|---|
| 6,047,327 A | * | 4/2000 | Tso | ...................... G06F 16/9537 |
| | | | | 709/232 |
| 6,636,746 B1 | | 10/2003 | Hashem et al. | |

(Continued)

FOREIGN PATENT DOCUMENTS

| | | |
|---|---|---|
| EP | 2900016 | 7/2015 |
| JP | 2012515473 A | 7/2012 |

(Continued)

OTHER PUBLICATIONS

File History of U.S. Appl. No. 15/669,167, 61 pages, filed Aug. 4, 2017.

(Continued)

*Primary Examiner* — Jenee Holland
(74) *Attorney, Agent, or Firm* — Gazdzinski & Associates, PC

(57) ABSTRACT

An example technique is performed by a client on a device, and includes: detecting a mobility state of the device; making a determination, based on the mobility state, about how to manage one or more connections between the device and one or more wireless networks; and managing the one or more connections based, at least in part, on the determination.

26 Claims, 6 Drawing Sheets

(51) Int. Cl.
*H04W 36/14* (2009.01)
*H04W 84/12* (2009.01)

(56) References Cited

U.S. PATENT DOCUMENTS

| | | | |
|---|---|---|---|
| 6,982,962 B1 | 1/2006 | Lunsford et al. | |
| 8,032,150 B2 | 10/2011 | Cole | |
| 8,073,441 B1 | 12/2011 | Unger et al. | |
| 8,090,386 B2* | 1/2012 | Alizadeh-Shabdiz | H04W 24/10 455/456.1 |
| 8,538,421 B2 | 9/2013 | Brisebois et al. | |
| 9,510,258 B1 | 11/2016 | Chaudhuri et al. | |
| 9,906,940 B2 | 2/2018 | Gupta et al. | |
| 10,200,884 B2* | 2/2019 | Tan | H04W 24/02 |
| 10,306,548 B2 | 5/2019 | Logan | |
| 10,652,807 B2 | 5/2020 | Logan | |
| 2001/0023446 A1 | 9/2001 | Balogh | |
| 2002/0046292 A1 | 4/2002 | Tennison et al. | |
| 2004/0122952 A1* | 6/2004 | Kistler | H04L 12/5692 709/227 |
| 2004/0185845 A1 | 9/2004 | Abhishek et al. | |
| 2005/0003816 A1 | 1/2005 | Vardoulias et al. | |
| 2005/0090275 A1 | 4/2005 | Wang | |
| 2005/0101323 A1 | 5/2005 | De Beer | |
| 2005/0148332 A1 | 7/2005 | Buckley et al. | |
| 2006/0166677 A1 | 7/2006 | Derakshan et al. | |
| 2006/0193287 A1* | 8/2006 | Ooshima | H04W 88/02 370/328 |
| 2006/0234705 A1 | 10/2006 | Oommen | |
| 2006/0235975 A1 | 10/2006 | Delhumeau et al. | |
| 2007/0019670 A1 | 1/2007 | Falardeau | |
| 2007/0066304 A1 | 3/2007 | Lee | |
| 2007/0255797 A1 | 11/2007 | Dunn et al. | |
| 2007/0268877 A1 | 11/2007 | Buckley et al. | |
| 2007/0275717 A1 | 11/2007 | Edge et al. | |
| 2008/0167033 A1 | 7/2008 | Beckers | |
| 2008/0287125 A1 | 11/2008 | Hind et al. | |
| 2009/0201908 A1 | 8/2009 | Gidron et al. | |
| 2009/0291686 A1* | 11/2009 | Alpert | H04W 36/0085 455/436 |
| 2010/0014455 A1 | 1/2010 | Oulai et al. | |
| 2010/0046466 A1 | 2/2010 | Morimoto et al. | |
| 2010/0081433 A1 | 4/2010 | Lee | |
| 2010/0149970 A1 | 6/2010 | Miranda et al. | |
| 2010/0153335 A1 | 6/2010 | Esteve Balducci et al. | |
| 2010/0159948 A1 | 6/2010 | Spivey et al. | |
| 2010/0296415 A1 | 11/2010 | Sachs et al. | |
| 2011/0029236 A1 | 2/2011 | Zhou et al. | |
| 2011/0165896 A1 | 7/2011 | Stromberg et al. | |
| 2011/0319084 A1 | 12/2011 | Meshkati et al. | |
| 2012/0166618 A1 | 6/2012 | Dahod | |
| 2012/0230305 A1 | 9/2012 | Barbu et al. | |
| 2012/0238287 A1 | 9/2012 | Scherzer et al. | |
| 2013/0044614 A1 | 2/2013 | Aguirre et al. | |
| 2013/0067535 A1 | 3/2013 | Kang et al. | |
| 2013/0262666 A1 | 10/2013 | Balwani | |
| 2013/0295962 A1 | 11/2013 | Manroa et al. | |
| 2013/0331098 A1 | 12/2013 | Balasubramaniyan et al. | |
| 2013/0344857 A1 | 12/2013 | Berionne et al. | |
| 2013/0347073 A1 | 12/2013 | Bryksa et al. | |
| 2014/0071854 A1 | 3/2014 | Xiang et al. | |
| 2014/0071895 A1 | 3/2014 | Bane et al. | |
| 2014/0092731 A1 | 4/2014 | Gupta et al. | |
| 2014/0092755 A1 | 4/2014 | Van De Ven et al. | |
| 2014/0140335 A1 | 5/2014 | Wang et al. | |
| 2014/0141839 A1 | 5/2014 | Larsson | |
| 2014/0274044 A1* | 9/2014 | Lee | H04W 48/16 455/434 |
| 2014/0315536 A1 | 10/2014 | Chow et al. | |
| 2015/0003417 A1 | 1/2015 | Akiyoshi et al. | |
| 2015/0023341 A1 | 1/2015 | Zhao et al. | |
| 2015/0038159 A1 | 2/2015 | Fang et al. | |
| 2015/0092553 A1 | 4/2015 | Sirotkin et al. | |
| 2015/0098392 A1 | 4/2015 | Homchaudhuri et al. | |
| 2015/0181405 A1 | 6/2015 | Dua et al. | |
| 2015/0245280 A1 | 8/2015 | Zhou et al. | |
| 2015/0305070 A1 | 10/2015 | Ahmad | |
| 2015/0312833 A1 | 10/2015 | Gresset et al. | |
| 2015/0358757 A1 | 12/2015 | Ford et al. | |
| 2015/0373633 A1 | 12/2015 | Chhabra et al. | |
| 2016/0066251 A1 | 3/2016 | Sirotkin et al. | |
| 2016/0073336 A1 | 3/2016 | Geller | |
| 2016/0150451 A1* | 5/2016 | Barreto De Miranda Sargento | H04W 36/32 370/332 |
| 2016/0227544 A1 | 8/2016 | Katar et al. | |
| 2016/0234674 A1 | 8/2016 | Maguire | |
| 2016/0316410 A1 | 10/2016 | Tan et al. | |
| 2016/0323900 A1 | 11/2016 | De et al. | |
| 2016/0345228 A1 | 11/2016 | Liu et al. | |
| 2016/0381606 A1 | 12/2016 | Lou et al. | |
| 2017/0034775 A1 | 2/2017 | Mandanapu | |
| 2017/0105216 A1 | 4/2017 | Jung et al. | |
| 2017/0134944 A1 | 5/2017 | Christian et al. | |
| 2018/0035365 A1 | 2/2018 | Koratekere Honnappa et al. | |
| 2018/0061373 A1 | 3/2018 | Sato et al. | |
| 2018/0083795 A1 | 3/2018 | Zehler et al. | |
| 2018/0176792 A1 | 6/2018 | Egner et al. | |
| 2018/0184330 A1 | 6/2018 | Egner et al. | |
| 2019/0045517 A1* | 2/2019 | Logan | H04W 72/10 |

FOREIGN PATENT DOCUMENTS

| | | |
|---|---|---|
| JP | 2014068151 A | 4/2014 |
| JP | 2014526849 A | 10/2014 |
| JP | 2016006926 A | 1/2016 |
| JP | 2016517669 A | 6/2016 |
| JP | 2016208371 A | 12/2016 |
| WO | WO-2011016397 A1 | 2/2011 |
| WO | WO-2016095974 A1 | 6/2016 |

OTHER PUBLICATIONS

File History of U.S. Appl. No. 15/669,182, 52 pages, filed Aug. 4, 2017.

File History of U.S. Appl. No. 15/669,192, 48 pages, filed Aug. 4, 2017.

File History of U.S. Appl. No. 15/669,151, 54 pages, filed Aug. 4, 2017.

* cited by examiner

CONNECTING TO A WIRELESS NETWORK BASED ON A DEVICE MOBILITY STATE

RELATED APPLICATIONS

This application is generally related to the subject matter of co-owned U.S. patent application Ser. No. 15/669,167 filed Aug. 4, 2017, entitled "PRIORITIZING PREFERRED NETWORKS," and issued as U.S. Pat. No. 10,506,616 on Dec. 10, 2019, Ser. No. 15/669,192 filed Aug. 4, 2017, entitled "VOTING TO CONNECT TO A WIRELESS NETWORK," and issued as U.S. Pat. No. 10,306,548 on May 28, 2019, and Ser. No. 16/422,632 filed May 24, 2019, entitled "VOTING TO CONNECT TO A WIRELESS NETWORK," and issued as U.S. Pat. No. 10,652,807 on May 12, 2020, as well as co-owned and co-pending U.S. patent application Ser. No. 16/708,024 filed Dec. 9, 2019 and entitled "CONNECTING TO A WIRELESS NETWORK BASED ON A DEVICE MOBILITY STATE," Ser. No. 15/669,182 filed Aug. 4, 2017 and entitled "SWITCHING CONNECTIONS OVER FREQUENCY BANDS OF A WIRELESS NETWORK," and Ser. No. 16/870,594 filed May 8, 2020 and entitled "VOTING TO CONNECT TO A WIRELESS NETWORK," each of the foregoing incorporated herein by reference in its entirety.

TECHNICAL FIELD

This specification relates generally to connecting to a wireless network based, at least in part, on the mobility state of a device.

BACKGROUND

A mobile device, such as a smartphone, is configured to connect to a wireless network, such as a WiFi network. This connection may break when the mobile device moves out of range of the wireless network. To maintain service, the device may need to create a connection to a different wireless network that is in-range of the mobile device at the mobile device's new location.

SUMMARY

An example method is performed by a client on a device, and comprises: detecting a mobility state of the device; making a determination, based on the mobility state, about how to manage one or more connections between the device and one or more wireless networks; and managing the one or more connections based, at least in part, on the determination. The example method may include one or more of the following features, either alone or in combination.

The one or more connections may comprise a first connection, and the one or more wireless networks may comprise a first wireless network. Managing the one or more connections may comprise maintaining the first connection to the first wireless network. The one or more connections may comprise a first connection and a second connection, and the one or more wireless networks may comprise a first wireless network and a second wireless. Managing the one or more connections may comprise causing the device to sever the first connection to the first wireless network and to create the second connection to the second wireless network.

The mobility state may be based, at least in part, on a velocity of the device. Making the determination about how to manage the one or more connections may comprise determining, based on the velocity, how aggressive to be about switching between two of the wireless networks.

The one or more connections may comprise a first connection and a second connection, and the one or more wireless networks may comprise a first wireless network and a second wireless network. The velocity may be within a first range or a second range, with the second range comprising greater velocities than the first range. Determining how aggressive to be about switching between two of the wireless networks may comprise: for the velocity in the second range, being more likely to sever the first connection to the first wireless network and to create the second connection to the second wireless network than for the velocity in the first range. The velocity may be within the first range, the second range, or a third range, with the third range comprising greater velocities than both the first range and the second range. Determining how aggressive to be about switching between two of the wireless networks may comprise: for the velocity in the third range, being less likely to sever the first connection to the first wireless network and to create the second connection to the second wireless network than for the velocity in the second range. The velocity may be within the first range, the second range, or the third range. For the velocity in the third range, determining how aggressive to be about switching between two of the wireless networks may be based on a duration that the device is in a presence of the first wireless network. The velocity may be within the first range, the second range, or the third range. For the velocity in the third range, determining how aggressive to be about switching between two of the wireless networks may be based on stored information identifying the first wireless network as being maintained by a mobile access point.

The mobility state may be based, at least in part, on a velocity of the device. In a case that the velocity is below a threshold, managing the one or more connections may comprise scanning at a first frequency for a wireless network among one or more wireless networks, and causing the device to connect to the wireless network based on one or more attributes. In a case that the velocity is above a threshold, managing the one or more connections may comprise scanning for the wireless network at a second frequency that is greater than the first frequency, and causing the device to connect to the wireless network based on the one or more attributes. The threshold may be a first threshold. In a case that the velocity is above a second threshold that is different from the first threshold, managing the one or more connections may comprise: ignoring one or more of the wireless networks while the velocity is above the second threshold; and waiting until the velocity is at least below the second threshold before attempting to cause the device to connect to the wireless network.

Managing the one or more connections may be based, at least in part, on one or more attributes relating to the device, the one or more wireless networks, or both the device and the one or more wireless networks. The one or more attributes may comprise at least one of network signal strength, device network preference, network signal-to-noise ratio (SNR), or network signal band. The mobility state may be based on a combination of a velocity of the device and a duration of time that the device has been in a presence of the one or more wireless networks. The mobility state may be based, at least in part, on global positioning system (GPS) readings.

An example method is performed by a client on a device, and comprises: determining a frequency at which to make network connection decisions based on a mobility state of the device and a presence of one or more wireless networks;

obtaining one or more attributes relating to the device, the one or more wireless networks, or both the device and the one or more wireless networks; and controlling the device to affect connection of the device to the one or more wireless networks based on the frequency and the one or more attributes. The example method may include one or more of the following features, either alone or in combination.

The one or more attributes may comprise at least one of network signal strength, device network preference, network signal-to-noise ratio (SNR), or network signal band. The one or more wireless networks may comprise a first wireless network. Controlling the device to affect connection of the device to the one or more wireless networks may comprise maintaining a first connection to the first wireless network.

The one or more wireless networks may comprise a first wireless network and a second wireless network. Controlling the device to affect connection of the device to the one or more wireless networks may comprise causing the device to sever a first connection to the first wireless network and to create a second connection to the second wireless network.

The mobility state may be based, at least in part, on a velocity of the device. The velocity of the device may be based, at least in part, on one or more readings from an accelerometer in the device. The velocity may be within a first range or a second range, with the second range comprising greater velocities than the first range. The frequency may be greater for the velocity in the second range than for the velocity in the first range. The velocity may be within the first range, the second range, or a third range, with the third range comprising greater velocities than both the first range and the second range. The frequency may be less for the velocity in the third range than for the velocity in the second range. The velocity may be within the first range, the second range, or the third range. The frequency for the velocity in the third range may be based, at least in part, on a time that the device is in a presence of wireless network.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
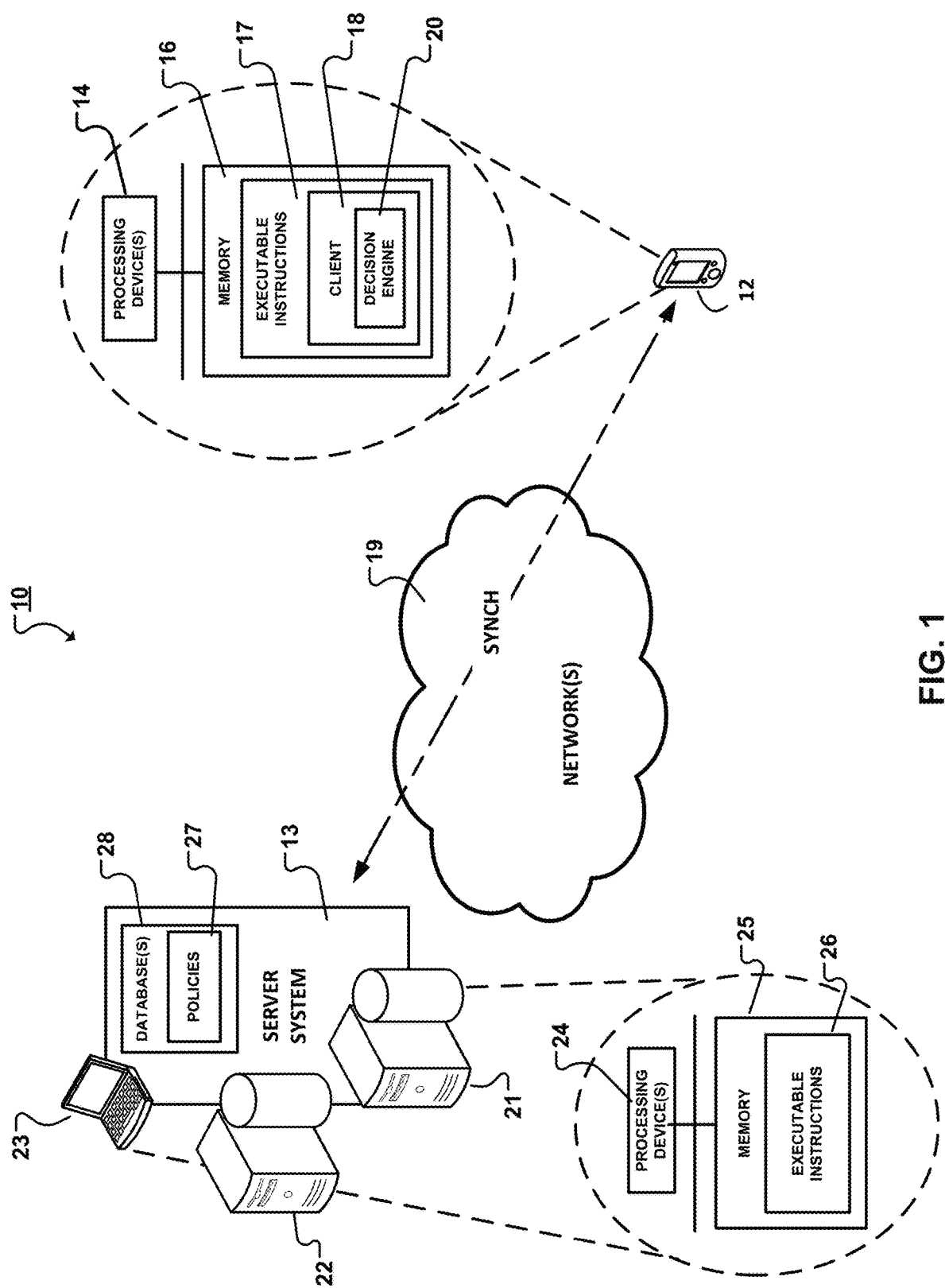
FIG. 1 is a block diagram of an example computer/network architecture on which the example processes described herein may be implemented.

Described herein are example processes, which may be performed by a client on a mobile device ("device"), for managing connections to wireless networks based on a mobility state of the device. The example processes are rooted in computer technology in order to overcome a problem specifically arising in the realm of computer networks. Specifically, movement of a device can result in changes to wireless network connectivity. For example, as a device moves, it goes into, and out of, ranges of different wireless networks. The rates at which the device connects to these different wireless networks can consume processor resources such as battery, and thereby affect operation of the mobile device. Accordingly, the processes described herein control connection of a device to different wireless networks based on a mobility state of the device. An example of the mobility state is the velocity of the mobile device, although other factors may contribute to the mobility state. By controlling the connection based on the mobility state, in some cases it is possible to improve device performance without overburdening connection resources.

In some examples, the networks include WiFi networks; however, the processes described herein ("the processes") may be used with any appropriate type of wireless network, examples of which are provided below. In some implementations, the processes include detecting a mobility state of the device, making a determination, based on the mobility state, about how to manage one or more connections between the device and one or more wireless networks, and managing the one or more connections based, at least in part, on the determination. Managing a connection may include, but is not limited to, maintaining an existing connection, severing an existing connection, and/or creating a new connection.

The mobility state corresponds to an amount of motion experienced by the mobile device. For example, the mobility state may be characterized by a speed or velocity of the device. Velocity may be detected, at least in part, using an accelerometer on the device. In some implementations, velocity may be detected based, in part, on a duration of time that the device has been in the presence of a wireless network or networks. In this regard, velocity may be detected based on a combination of appropriate factors including, but not limited to, accelerometer readings, the duration of time that the device is in the presence of a wireless network, global positioning system (GPS) readings, and so forth. For example, GPS readings for a device at different locations may be taken, and the time between those readings used to determine the device's velocity. In some implementations, the mobility state may be characterized by movements in addition to, or instead of, the velocity of the device. For example, in some cases, rotational movements, pivoting movements, acceleration, deceleration, or other types of movement may affect, or may factor into, the characterization of a mobility state.

According to the example processes, the mobility state of a device affects how aggressively the device switches between wireless networks. For example, if the device is relatively immobile and all else is relatively equal, the processes may be less aggressive about switching between wireless networks. The assumption is that, unless there is something to be gained by switching, such as additional network throughput, there is no need to make a switch, since switching may cause a disruption in service, increase battery consumption, and so forth. On the other hand, if the device is moving at a moderate velocity, the processes may be more aggressive about switching between wireless networks. The assumption in this case is that the movement may cause the device to go out of range of its current network, causing network disruption that can be remedied by making a connection to a new wireless network. Accordingly, the processes aggressively search for new networks while the device is moving at a moderate velocity, and connect, e.g., in sequence, to appropriate networks that have favorable connection attributes. In an example, as a network connection falls below a predefined throughput, e.g., as the device begins to go out of range of the network, the processes may connect the device to a new, higher-throughput network, and sever the prior connection. If the device is moving at a relatively high velocity, the processes again may be less aggressive about switching between wireless networks. The assumption in this case is that, due to the high velocity, the device will pass quickly through a number of wireless networks. The advantages of switching for each network encountered will be more than offset by the consumption of device resources. That is, due to the amount of switching performed, the device's performance may degrade. So, less switching is performed. For example, the processes may switch between wireless networks opportunistically. In some implementations, the processes may switch when the device drops below a predefined velocity; the processes may switch only every $N^{th}$ (N>1) network encountered; the processes may switch only when the device moves out of range of an existing connection; and so forth.

In the above examples, factors in addition to velocity may be considered when determining whether, and when, to switch between wireless networks. For example, the processes may make a determination about how aggressive to be about switching networks based on velocity, and then use one or more network attributes and/or device attributes in determining whether, and when, to make a switch. For example, network or device attributes such as throughput, network quality-of-service (QoS), available network bandwidth, network security, network signal strength, network signal-to-noise ratio (SNR), device network preference, network signal band, device Internet service provider (ISP), number of users, and so forth may be taken into account. This list is not exhaustive, and any appropriate considerations may be taken into account in determining whether, and when, to switch networks. In some implementations, these attributes may be weighted appropriately, depending upon their importance to the device's user. For example, if the user has designated throughput as a critical factor, throughput measurements may be weighted greater than other attributes in determining whether to switch between wireless networks in one or more mobility states.

The example processes may be performed, in whole or in part, by a client stored in memory on the mobile device. The client may include one or more software modules comprised of executable instructions to implement the network switching processes described herein. In some implementations, the client runs continuously in the background during device operation. The example processes may be implemented, at least in part, also using one or more servers ("servers"). The servers may include one or more software modules comprised of executable instructions to configure the mobile device to perform the switching. For example, in some implementations, the servers may store policies that impact whether, and when, the mobile device switches between wireless network. In some implementations, the client may optimize a server's policy in order to make transitions between wireless networks as seamless as possible.

The policies may be loaded onto the servers by an owner of the mobile device or by any other appropriate party having an interest in the operation of the mobile device. For example, an ISP, a mobile network provider, or other party may load the policies on the servers. A Web interface, application programming interface (API), or other appropriate interface may be used to load the policies onto the server. The mobile device may synchronize ("synch") with the server intermittently, periodically, or at any appropriate time to receive, from the server, an operational policy ("policy") that is designated for the mobile device. Synching may be user-initiated or it may be performed automatically based on time or some operational trigger. Either the mobile device or the server may initiate communication. The mobile device and the server may communicate with each other over the Internet or over any other appropriate network or networks. In some implementations, the server may push a policy to the mobile device, or the mobile device may pull a policy from the server. In some examples, the policies on the server may be indexed by telephone number, user name, address, device identifier, or other appropriate indicia. The server may recognize the mobile device based on information such as this, and access appropriate policies for the mobile device.

An example policy for a mobile device may specify, among other things, whether, when, and under what circumstances to switch between wireless networks. For example, the policy may specify how aggressive to be at making network connections, factors to consider when making a connection decision, and the velocity ranges at which different levels of aggressiveness are to be employed. To the last point, the policy may specify a frequency at which to make network connection decisions based on a mobility state of the device—e.g., less aggressive in a first velocity, more aggressive in a second velocity range, and less aggressive in a third velocity range, where the first velocity range includes the slowest velocities, the second velocity range includes intermediate velocities, and the third velocity range includes the fastest velocities. The policies are not limited to any particular device configuration and operation, and may be used to implement switching under any appropriate circumstances and with any appropriate constraints.

FIG. 1 shows an example computer/network architecture 10 on which the example processes may be implemented. The processes, however, are not limited to use with the FIG. 1 architecture, and may be implemented on any appropriate computer architecture and/or network architecture.

In FIG. 1, example computer/network architecture 10 includes a mobile device 12 and a server system 13. The mobile device may be, or include, any appropriate device capable of communicating over a computer network including, but not limited to, a smartphone, a cellular telephone, a digital camera, a tablet computing device, a laptop computer, and so forth. Mobile device 12 may include one or more processing devices 14 (e.g., microprocessors) and memory 16 storing computer/machine-executable instructions 17 that are executable by the one or more processing devices. The instructions may be part of one or more computer programs that implement a client 18 that controls network switching functionality described herein. In some implementations, the client may include a decision engine 20 that performs at least part of the processes. In some implementations, the client may be part of a larger decision engine 20. In some implementations, the client and the decision engine may be one in the same. Mobile device 12 may be connected to, and accessible over, any appropriate network 19, such as a WiFi network, an LTE (long-term evolution) network, and so forth.

Server system 13 may include one or more computing devices 21, 22, 23 examples of which may include one or more servers, desktop computers, mobile devices, and so forth. An example server system may include one or more processing devices 24 (e.g., microprocessors) and memory 25 storing instructions 26 that are executable by the one or more processing devices. The instructions are part of one or more computer programs that may be used to implement at least part of the network switching processes described herein. For example, the instructions may enable communication between the mobile device and the server system in order to provide the client on the mobile device with policies 27 that control the device's operation, including to implement the network switching processes. These policies may be stored in a database 28 on the server system or at any other appropriate location that is accessible to the server system. Server system 12 may also be connected to, and accessible over, a wired or wireless network 19. In some implementations, the processes may not use the server system, but rather may be implemented solely on the mobile device. For example, policies may be pre-installed on the mobile device, or a user of the mobile device may program the mobile device with one or more appropriate policies.

Mobile device 12 and server system 13 may communicate with each other, and with other systems, such as those described herein, over one or more computer networks, which may include wireless and/or wired networks.

Figure 2:
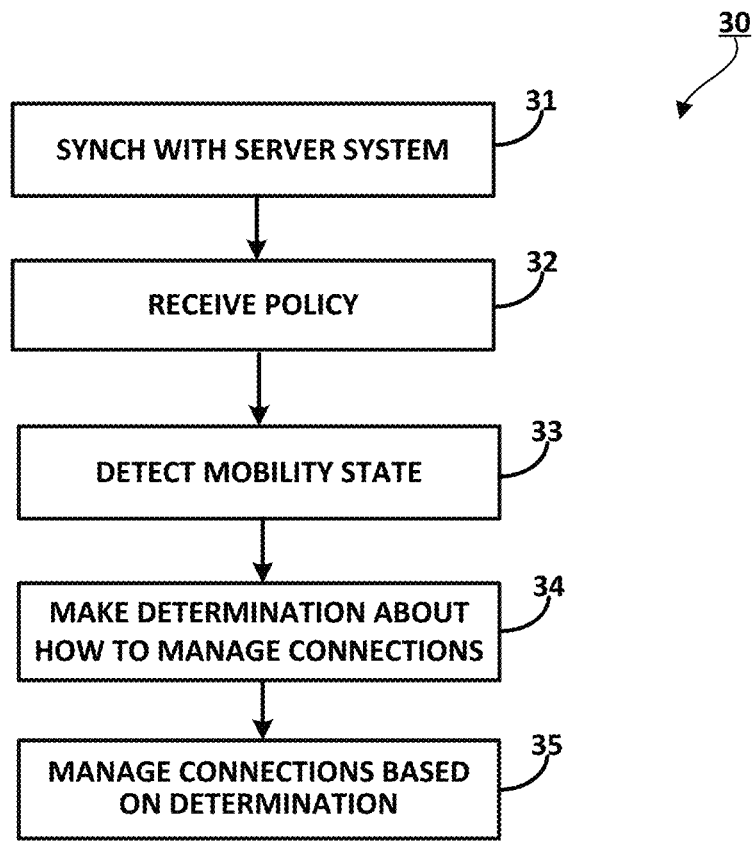
FIG. 2 is a flowchart showing an example process for managing wireless network connections based on the mobility state of a device.

FIG. 2 shows an example process 30 for switching between networks. Process 30 may be performed by client 18 in whole, or in part, on the architecture of FIG. 1. According to process 30, client 18 in mobile device 12 synchs (31) with server system 13 over one or more computer networks 19. As explained, during this synchronization, a policy may be pushed by the server system to the client, or the client may request and receive the policy from the server system. The policy specifies, among other things, the circumstances under which the device may switch between wireless networks. As explained, a policy may specify how aggressive the client is to be about switching networks based on device mobility state, and how to use device attribute(s), network attribute(s), or both in determining whether, and when, to switch between wireless networks. Examples of attributes that may be taken into account include, but are not limited to, network throughput, QoS, available bandwidth, network security, network signal strength, network SNR, device network preference, network signal band, device ISP, number of users on the network, device processing capabilities, device internal memory, remaining device battery life, device battery capacity, and so forth. Other attributes not specified herein may be used instead of, or in addition to, those specified. In addition, attributes other than device and network attributes may be factored into switching decisions. For example, if the device is moving into an area having large amounts of radio frequency (RF) background signals or other radiation, this may affect switching.

Figure 3:
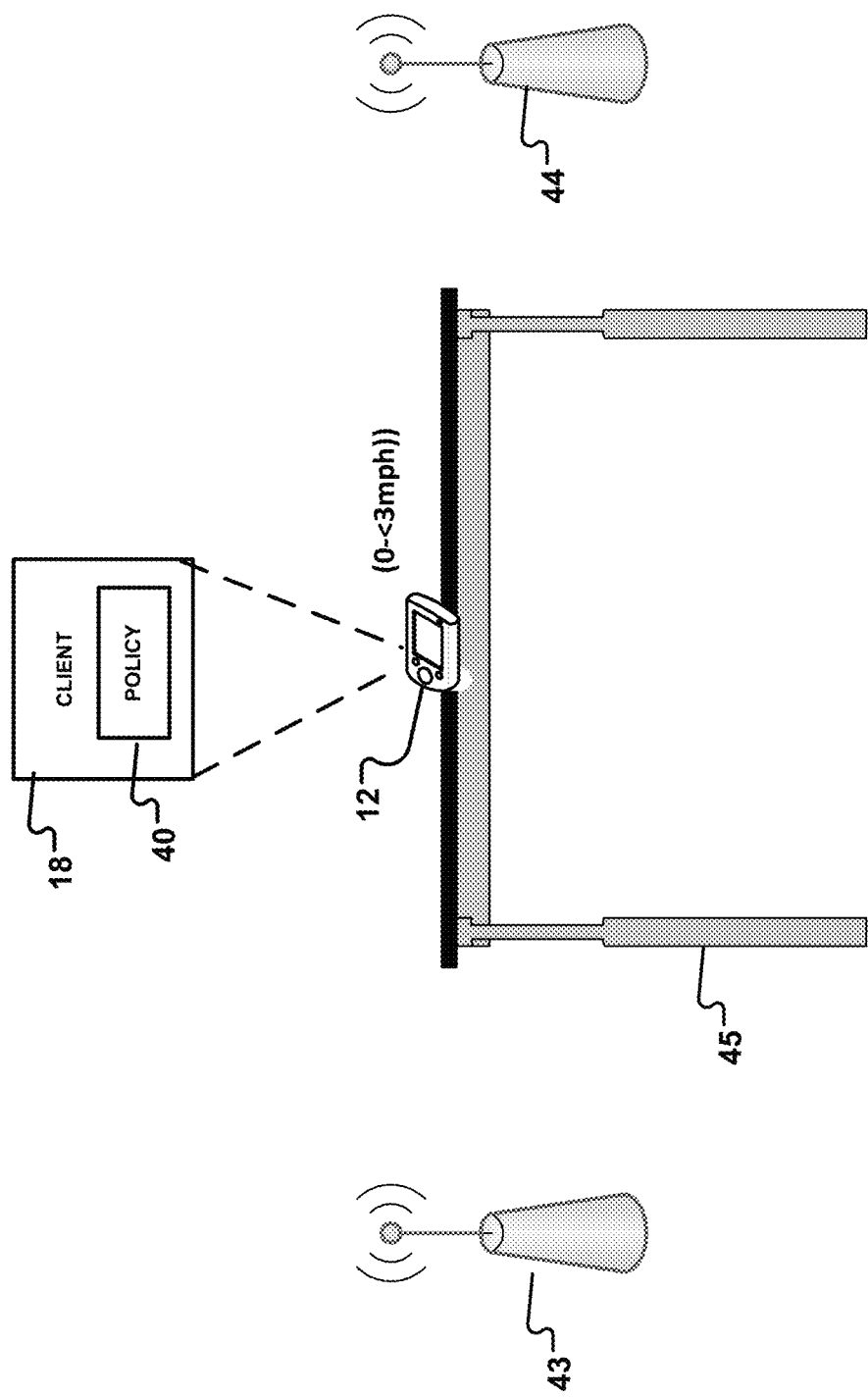
FIG. 3 is a diagram showing a mobile device in a first mobility state in the presence of two wireless networks.

In some implementations, referring to FIG. 3, a policy 40 may specify that a client 18 is to be less aggressive about switching between wireless networks 43 and 44 when a device 12 is immobile or moving slowly. In the example of FIG. 3, device 12 is resting on table 45, but is in the presence of networks 43 and 44. In an example, policy 40 may specify that the client is to be less aggressive about switching wireless networks when the device is moving from zero (0) miles-per-hour (mph) up to just below (less than) three (<3) mph.

In some implementations, less aggressive switching in the first velocity range (0-<3 mph) may include scanning for other networks less frequently than in other velocity ranges, which will result in fewer opportunities to evaluate whether to switch and, therefore, likely less switching. Scanning less frequently may reduce device battery consumption. For example, in some implementations, the client scans for networks every thirty (30) minutes; however, any appropriate scanning duration may be used. In some implementations, assuming two wireless networks in range of the mobile device are about equal in terms of factors such as those listed herein, in this first velocity range, the client is less likely than in a greater velocity range (e.g., 3-<15 mph) to sever an existing connection to a wireless network 43 and to create another, different connection to a different wireless network 44.

In some implementations, less aggressive switching includes not switching between wireless networks unless there is more than a predefined benefit that accrues to the operation of the mobile device. For example, in some implementations, an existing connection to a wireless network 43 may be maintained absent extenuating circumstances. For example, switching to another wireless network in range, such as wireless network 44, may not be performed unless there is more than a predefined gain in one or more of the following: network throughput, QoS, available bandwidth, network security, or network signal strength. In some implementations, switching may not be performed unless another network is a more preferred network for the device, the other network uses a preferential signal band for the device, the other network is maintained or owned by an ISP for the device, the other network has fewer users, or some combination of these or other factors. Device processing capabilities (e.g., how many clock cycles a CPU can perform per second), device internal memory, remaining device battery life, device battery capacity, and so forth may also be taken into account when determining whether to switch networks.

Figure 4:
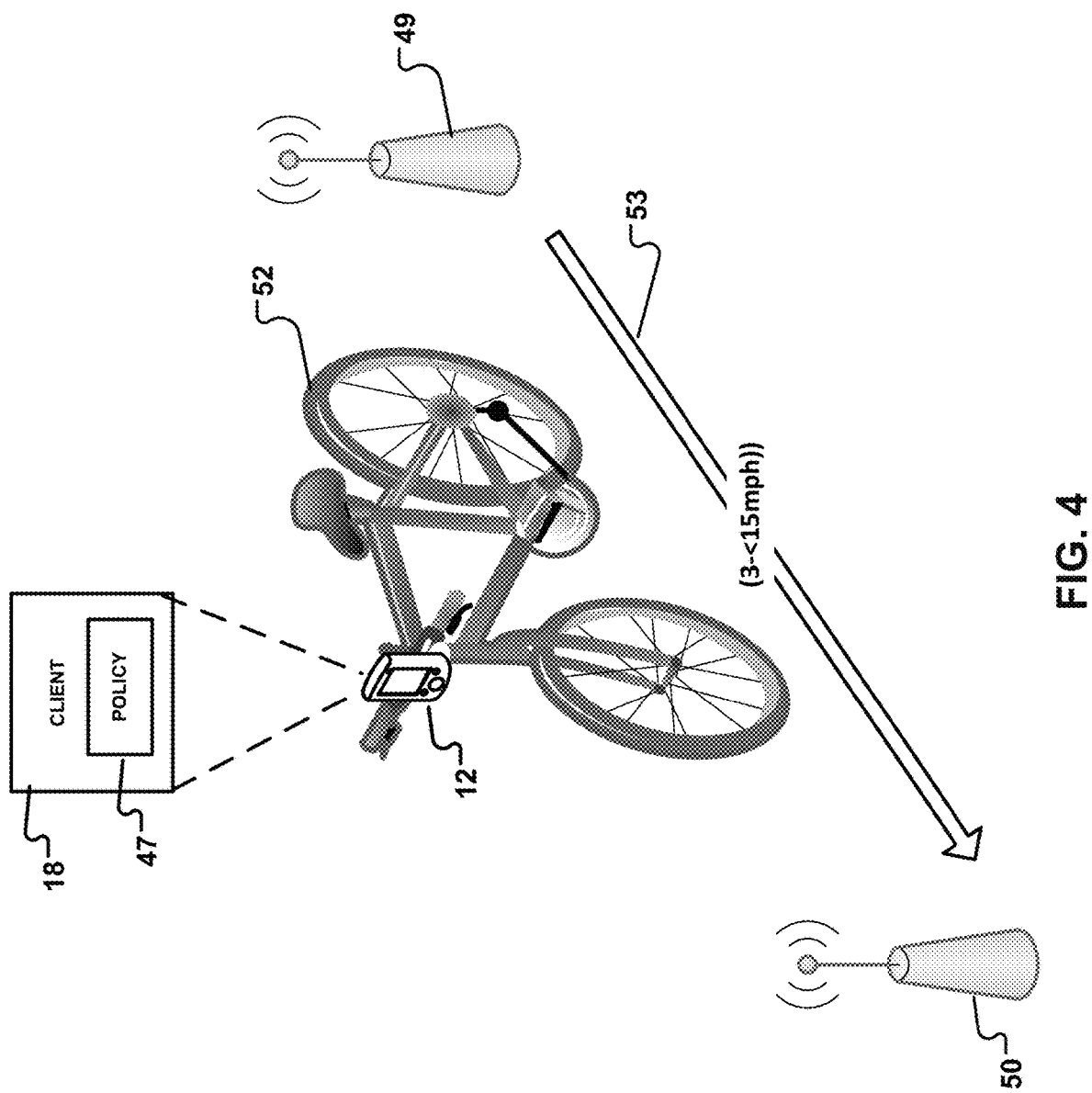
FIG. 4 is a diagram showing a mobile device in a second mobility state moving between two wireless networks.

In some implementations, referring to FIG. 4 a policy 47 may specify that the client 18 is to be more aggressive about causing the device 12 to switch between wireless networks 49 and 50 when the device is moving at a moderate velocity than when the device is moving slowly. In this example, device 12 is moving on a bicycle 52 in the direction of arrow 53 at a moderate velocity from wireless network 49 towards wireless network 50, and may be controlled to switch from an existing connection to wireless network 49 to a new connection to wireless network 50.

In an example, policy 47 may specify that the client is to be more aggressive about switching wireless networks when the device is moving from three (3) miles-per-hour (mph) up to just below (less than) fifteen (<15) mph. In an example, more aggressive switching includes being more likely to switch connections in this second (3-<15 mph) range than in the first (0-<3 mph) range, assuming all else is equal.

In some implementations, more aggressive switching in the second velocity range (3-<15 mph) may include scanning for other networks more frequently than in other velocity ranges, which will result in more opportunities to evaluate whether to switch and, therefore, likely result in more switching. In some implementations, assuming two wireless networks are about equal in terms of attributes such as those listed herein, in this second velocity range, the client is more likely than in a lower velocity range (e.g., the 0-<3 mph described above) to sever an existing connection to an initial wireless network 49 and to create another, different connection to a different wireless network 50.

In some implementations, more aggressive switching includes switching between wireless networks automatically as a new network is detected so long as the new network has some predefined minimum characteristics, which may be measured based on the attributes listed herein. In some implementations, more aggressive switching includes not switching between wireless networks unless there is more than a predefined benefit that accrues to the operation of the mobile device. However, the predefined benefit in this second range (3-<15 mph) may be less than the predefined benefit required for switching in the first range (0-<3 mph). In an example, assuming all else is equal, switching to another network in this second range (3-<15 mph) may be performed if the other network increases download speed by 25% or more, whereas switching in the first range (0-<3 mph) may only be performed if the other network increases download speed by 200% or more. In another example, assuming all else is equal, switching to another network in this second range (3-<15 mph) may be performed if the other network decreases network latency by 10% or more, whereas switching in the first range (0-<3 mph) may only be performed if the other network decreases network latency by 50% or more.

In some implementations, switching may be required because the mobile device eventually moves out of range of an existing connection and, as a result, a new connection is required. In some implementations, switching may occur when, as a result of movement, network performance drops below a predefined level. Any appropriate network may be selected to make the new connection. In some implementations, there may be more than one network to select from when making the new network connection. In examples such as this, a network may be selected that has a better/best gain in one or more of the following: throughput, QoS, available bandwidth, network security, network signal strength, or some combination of these or other attributes. In some implementations, a network may be selected because the network is a more preferred network for the device, the network uses a preferential signal band for the device, the network is maintained or owned by an ISP for the device, the network has fewer users, or some combination of these or other factors. Device processing capabilities, device internal memory, remaining device battery life, device battery capacity, and so forth may also be taken into account when determining whether to switch networks.

Figure 5:
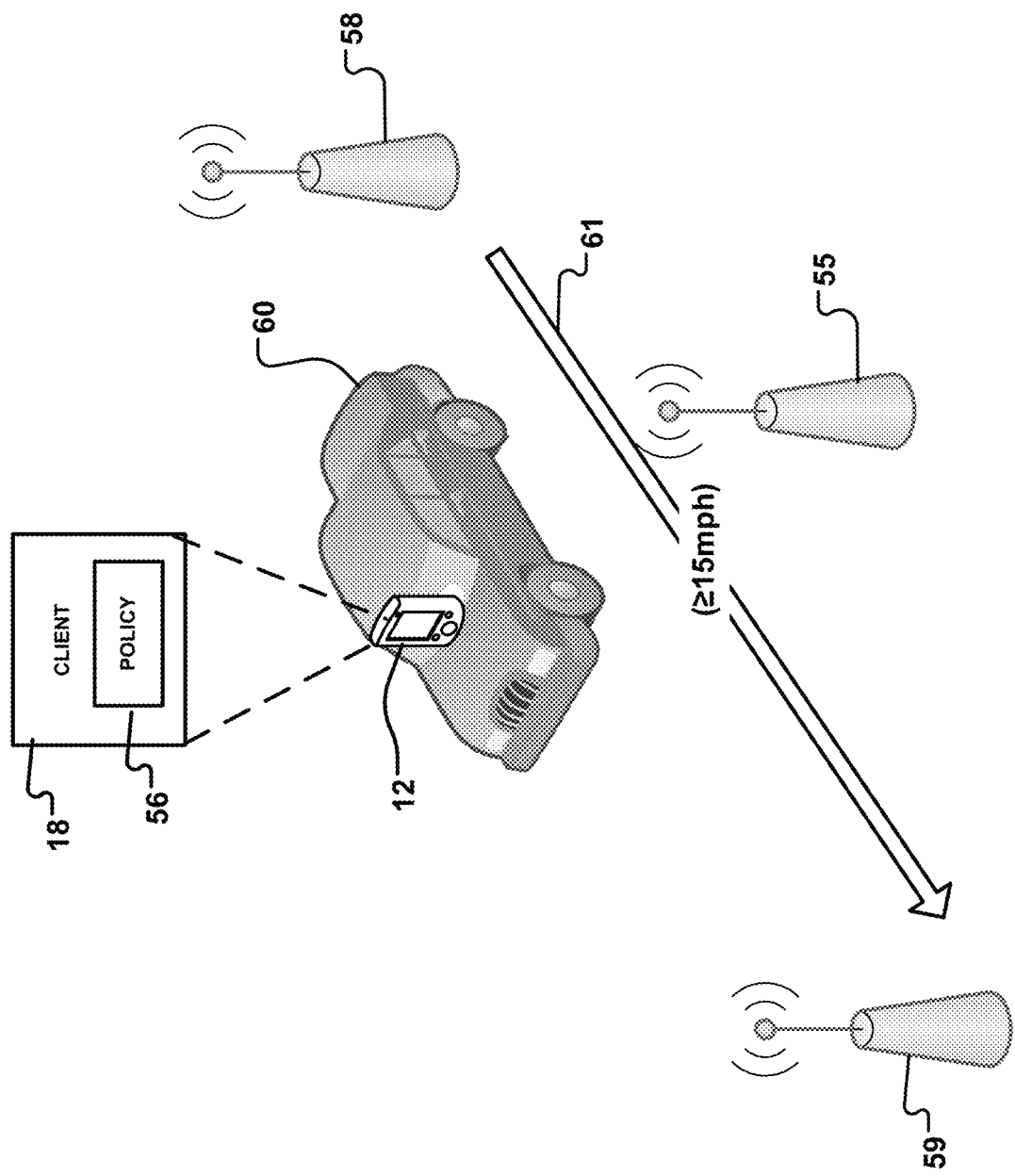
FIG. 5 is a diagram showing a mobile device in a third mobility state moving between two wireless networks.

In some implementations, referring to FIG. 5, a policy 56 may specify that the client 18 is to be less aggressive about switching between wireless networks 58 and 59 when the device is moving at a high velocity. In this example, device 12 is moving on an automobile 60 in the direction of arrow 61 from wireless network 58 towards wireless network 59, and may be controlled to switch from an existing connection to wireless network 58 to a new connection to wireless network 59. In an example, policy 56 may specify that the client is to be less aggressive about switching wireless networks when the device is moving at fifteen (15) mph or greater (15 mph). In some implementations, the less aggressive switching may include being opportunistic about switching between wireless networks. For example, being opportunistic may include ignoring one or more of wireless networks that the mobile device encounters during movement at high velocity (such as wireless network 55), and waiting until the velocity of mobile device 12 decreases to below a threshold (e.g., to below 15 mph) before attempting to cause the device to connect to a new wireless network 59. Once the device is below the threshold, the client may then attempt to connect to a wireless network within range. Attributes that may influence a connection decision include, but are not limited to, those described above. These may include, for example, throughput, QoS, available bandwidth, network security, network signal strength, device network preference, network signal band, device ISP, number of users, and so forth.

In some implementations, switching may be required even at high velocity because the mobile device eventually moves out of range of an existing connection and, as a result, a new connection is required. In some implementations, switching may occur when, as a result of movement, network performance drops below a predefined level. At that point, any appropriate network may be selected to make the new connection. In some implementations, there may be more than one network to select from when making the new network connection. In examples such as this, an appropriate network may be selected for connection by taking into account one or more of the device attributes and network attributes described herein.

As noted, in some implementations, switching may be required even at high velocity because the mobile device eventually moves out of range of an existing connection and, as a result, a new connection is required. In some implementations, the less aggressive switching performed at high velocities may include not attempting connection to at least some wireless networks encountered during movement at the high velocity. For example, networks may be scanned for less frequently by the client, resulting in fewer connections. In some implementations, policy 58 may allow the client to attempt to connect only to every $N^{th}$ (N>1) wireless network encountered during movement. In some implementations, this may be constrained by distances between networks. For example, if the client encounters numerous networks within a defined distance, then the policy may only allow attempts to connect for every $N^{th}$ network encountered. On the other hand, if there is limited network connectivity over a distance, the policy may make allowances and allow the client to attempt to connect each time a wireless network is encountered.

The foregoing policies are examples only. Any appropriate policy may be implemented using the server system and mobile devices described herein. Furthermore, although example values are ascribed to the low, intermediate/moderate, and high velocity ranges, those different ranges may be defined by any appropriate numerical velocities. Other factors, such as those described below, may affect how policies are implemented or may be included in the policies themselves. Furthermore, there may be less than, or more than, three policies stored in the server system and accessible to the mobile device.

Referring back to FIG. 2, client 12 receives (32) a policy as a result of synchronization with the server system. The received policy may be programmed into the client to cause the device to operate in accordance with the policy. In some implementations, more than one policy may be programmed into the client. If two or more policies have incompatible provisions, the client may resolve any incompatibilities in accordance with one or more stored rules.

The client detects (33) a mobility state of the device. The detection may be based on the policy or policies received. For example, if a policy specifies three velocity ranges that define the mobility states of the device, the client will obtain the velocity of the device and determine a velocity range into which the detected velocity falls. For example, the device velocity may be compared to a first threshold (e.g., 3 mph) to determine if the velocity is in the first range; the device velocity may be compared to the first threshold and a second threshold (e.g., 3 mph and 15 mph) to determine if the velocity is in the second range, and the device velocity may be compared to the second threshold (e.g., 15 mph) to determine if the velocity is in the third rage. As noted, in some implementations, the velocity of the device may be detected, at least in part, using an accelerometer on the device. For example, the client may read the accelerometer of the device to obtain the velocity of the device. In some implementations, the velocity may be detected based on a duration of time that the device has been in the presence of a wireless network or networks. For example, as described in an example below, in some cases, a device may be moving within a moving object. Accordingly, the accelerometer may indicate movement. However, the movement that is relevant is not overall movement of the device, but rather the movement of the device within the moving object. In cases like this, for reasons explained below, movement may be detected also based on the duration that the device was in the presence of a wireless network. Thus, in some implementations, velocity may be detected based on a combination of factors including, but not limited to, those listed here.

The client makes a determination (34), based on the detected mobility state of the device, about how to manage one or more connections between the device and one or more wireless networks. As explained herein, in some implementations, managing the connections may include causing the device to maintain a connection to a wireless network or managing the connection may include causing the device to sever an existing connection to an initial wireless network and causing the device to create another, different connection to another, different wireless network. In some implementations, the act of making the determination includes determining how aggressive to be about switching between two of the wireless networks. For example, the act of making the determination may include determining to be less aggressive about switching connections or more aggressive about switching connections. In this regard, less aggressive and more aggressive are intended to be relative terms, and need not be quantifiable. Examples of switching that is less aggressive and more aggressive are described above with reference to policies stored on the server system. In some implementations, making the determination may include affecting a frequency at which the client makes network connection decisions based on a mobility state of the device and a presence of one or more wireless networks. For example, a policy may require the client to scan for other networks more or less frequently based on the mobility state of the device, resulting, respectively, in more or fewer network-connection decision-making opportunities and, thus, more or less switching.

The client manages (35) device network connections based on the determination about the level of aggressiveness to use. This level is defined based on the policy being employed by the client and the mobility state of the device. Managing the connection may include, among other things, obtaining one or more attributes relating to the device, the one or more wireless networks, or both the device and the one or more wireless networks; and controlling the device to affect connections of the device to the one or more wireless networks based on the one or more attributes and the level of aggressiveness defined by the policy. As noted, the level of aggressiveness may be defined, at least in part, based on the frequency at which network connection decisions are made. Controlling the device to affect a connection to a wireless network may include, as described herein, causing the device to maintain an existing network connection based on constraints defined in one or more policies. Controlling the device to affect a connection to a wireless network may include, as described herein, causing the device to sever an existing connection to a first wireless network and to create a new connection to a second wireless network based on constraints defined in one or more policies.

In some implementations, the attributes relating to the device may be obtained by a separate engine (not shown) in the client, and may be obtained from the device itself or from a device profile obtained from the server system at the time a policy is obtained. In some implementations, the attributes relating to the wireless networks may be obtained from the networks through measurement (e.g., by sending and receiving test packets), or from network profiles obtained from the server system at the time a policy is obtained.

In some implementations, the processes employ voting modules to evaluate a candidate wireless network based on the attributes. The voting modules may evaluate one or more network attributes and/or device attributes in determining whether to connect to a wireless network. In some implementations, each voting module issues a vote, that is based on its analysis, and that indicates whether or not to connect to the candidate network. For example, each voting module may evaluate an attribute relative to a predefined baseline, and approve or deny connection to the wireless network based on whether the baseline is met. The votes may be used in determining whether to connect to the candidate network.

Figure 6:
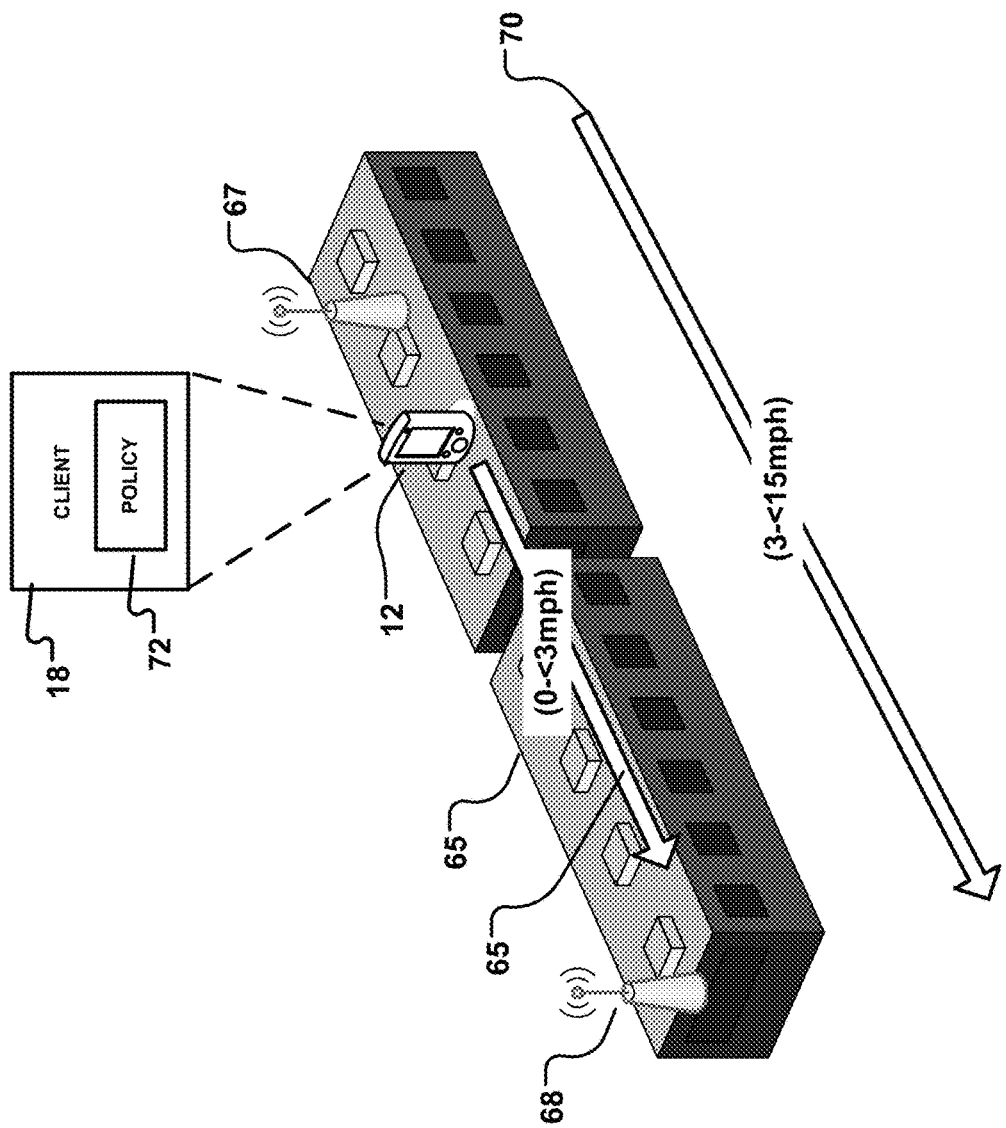
FIG. 6 is a diagram showing a mobile device in a first mobility state moving between two wireless networks on a train in a second mobility state.

As explained, in some cases, device velocity may be detected based on a duration of time that the device has been in the presence of a wireless network or networks. For example, in some cases, device 12 may be moving within a moving object. Referring to FIG. 6, device 12 may be on a train 65 (or an airplane, for example). The train may include multiple wireless networks 67 and 68 that move along with motion of the train. In this regard, train 65 is moving along the direction of arrow 70 at 3-<15 mph As device 12 moves in the train from car-to-car along the direction of arrow 71, the device may encounter different wireless networks. For example, the device may move from the range of wireless network 67 to the range of wireless network 68. Relative movement of the device may, however, be at a relatively slow pace (e.g., 0-<3 mph). However, because the train is moving, the device's accelerometer may register a higher velocity (e.g., 3-<15 mph). In cases like this, other factors, such as the duration that the device is in the presence of a wireless network, may be used to determine in which range the velocity of the device falls. For example, if a device accelerometer indicates that the device has moved a distance of one (1) mile, yet the device remains in the presence of a single WiFi network (e.g., wireless network 67) during this entire time, then client 18 may determine that the device is moving inside of another machine that is itself moving. In this case, the client determines device velocity based on the duration that the device is in the presence of the WiFi network and the movement of the device between known or detectable reference points, such as network access points. Using this information, the client can determine the rate of device movement with the machine, and use that rate of movement to characterize the device's mobility state. Policy 72 may contain instructions to control the client to make these determinations, and may contain information to control switching between wireless networks as described herein.

In some implementations, the client may record, and store locally (e.g., in a cache on the device), the identities of networks that the client has encountered. In some implementations, the client may store the identities of networks encountered in all velocity ranges. In some implementations, the client may store the identities of networks encountered in a subset of velocity ranges. In some implementations, the client may store the identities of networks encountered in a single velocity range. In an example, the client may store the identities of networks encountered in a third velocity range (e.g., ≥15 mph) that have high dwell times. An example dwell time is a time that the device is in-range of the network. A dwell time is considered high if it exceeds some predefined threshold, which may be measured in minutes, hours, or days, for example. For example, a device traveling on a train may record a velocity in the 15 mph range, but may have a high dwell time relative to an on-train wireless network. The information stored may be used to determine that the device is on a moving device (e.g., a train or an airplane), and to reduce the amount of time that it takes to adjust how network switching is performed. For example, the stored information may identify the network as being mobile in the sense that the network is maintained by a mobile access point and, therefore, that that the device is in the presence of a mobile access point. The client may use this information to automatically configure the device to change its switching behavior as described herein. In some implementations, the information is stored for a period of time and may be deleted after a period of time. In some implementations, the information is a flag that is cached based on the media access control (MAC) network address of the network access point. In some implementations, the information may be shared among clients of different devices, as appropriate. For example, the information may be uploaded to the server system and distributed to different clients on different devices. In some implementations, the information may be shared directly among clients, e.g., in cases where different clients are connected to the same network, and user approval and/or appropriate compliance with device security protocols are met.

The processes have been described in the context of WiFi networks; however, the processes may be used with any appropriate wireless network or networks. Examples of such other networks include, but are not limited to, cellular networks, such LTE networks, 3G networks, and 4G networks, Internet-of-Things (IoT) networks, local area networks (LANs), wide area networks (WANs), or any appropriate combination of wireless networks. In this regard, the processes may be applied to switch between the same type, or between different types, of wireless networks. For example referring to FIG. 4, wireless networks 49 and 50 may both be WiFi networks; wireless network 49 may be a WiFi network and wireless network 50 may be an LTE network; wireless network 49 may be a 3G network and wireless network 50 may be an LTE network; and so forth.

The processes may be used with both managed and unmanaged wireless networks. In some examples, to operate on a managed network, the client obtains device security credentials along with a policy. Examples include, but are not limited to, a username and password. This information is provided to the wireless network during connection operations. In some examples, to operate on an unmanaged network, the device itself knows the security credentials, e.g., the security credentials are not provided by the sever system along with the policies. This information is provided to the wireless network during connection operations.

Computing systems that may be used to implement all or part of the server system described herein may include various forms of digital computers. Examples of digital computers include, but are not limited to, laptops, desktops, workstations, personal digital assistants, servers, blade servers, mainframes, and other appropriate computers. Computing systems may be part of, included in, or used to implement all or part of the mobile devices described herein. Examples of mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a smartphone or server, may include a hard drive for storing data and computer programs, and a processing device (e.g., a microprocessor) and memory (e.g., RAM) for executing computer programs.

A computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. A computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A computerized method performed by a computerized client device, the computerized method comprising:
    determining a frequency at which to make one or more network connection decisions based at least on a mobility state of the computerized client device and a presence of one or more wireless networks;
    obtaining data indicative of one or more attributes relating to the computerized client device, the one or more wireless networks, or both the computerized client device and the one or more wireless networks;
    employing a plurality of voting modules, each of the plurality of voting modules configured to evaluate at least one of the one or more attributes relative to a predefined baseline and issue a vote relating to whether to effect a connection of the computerized client device to the one or more wireless networks; and
    controlling the computerized client device to effect the connection of the computerized client device to the one or more wireless networks based at least on the frequency and the votes from the plurality of voting modules.

2. The computerized method of claim 1, wherein the obtaining of the data indicative of the one or more attributes comprises obtaining data related to at least one of: network signal strength, device network preference, network signal-to-noise ratio (SNR), or network signal band.

3. The computerized method of claim 1, wherein the one or more wireless networks comprise a first wireless network; and
    wherein the controlling of the computerized client device to effect the connection of the computerized client device to the one or more wireless networks comprises maintaining a first connection to the first wireless network.

4. The computerized method of claim 1, wherein the one or more wireless networks comprise a first wireless network and a second wireless network; and
    wherein the controlling of the computerized client device to effect the connection of the computerized client device to the one or more wireless networks comprises causing the computerized client device to sever a first connection to the first wireless network and to create a second connection to the second wireless network.

5. The computerized method of claim 1, further comprising determining the mobility state based, at least in part, on a velocity of the computerized client device, the velocity of the computerized client device being based, at least in part, on one or more readings from an accelerometer in the computerized client device.

6. The computerized method of claim 5, wherein the determining of the mobility state comprises identifying that the velocity is within a first range or a second range, the second range comprising greater velocities than the first range; and
    wherein the frequency is greater for the velocity in the second range than for the velocity in the first range.

7. The computerized method of claim 6, wherein the determining of the mobility state comprises identifying that the velocity is within the first range, the second range, or a third range, the third range comprising greater velocities than both the first range and the second range; and
    wherein the frequency is less for the velocity in the third range than for the velocity in the second range.

8. The computerized method of claim 6, wherein the determining of the mobility state comprises identifying that the velocity is within the first range, the second range, or a third range, the third range comprising greater velocities than both the first range and the second range; and
    wherein the frequency for the velocity in the third range is based, at least in part, on a time that the computerized client device is in a presence of the one or more wireless networks.

9. Computer readable apparatus comprising: a non-transitory storage medium, the non-transitory storage medium comprising at least one computer program having a plurality of instructions, the plurality of instructions configured to, when executed on a processing apparatus:
    determine a frequency at which to make network connection decisions based at least on a mobility state of a computerized client device and a presence of one or more wireless networks, the mobility state comprising a velocity within a first range or a second range, the second range comprising greater velocities than the first range;
    obtain data indicative of one or more attributes relating to the computerized client device, the one or more wireless networks, or both the computerized client device and the one or more wireless networks;
    prioritize the one or more attributes, wherein the prioritization is based at least on one or more preferences identified by a user of the computerized client device; and control the computerized client device to effect connection of the computerized client device to the one or more wireless networks based at least on the frequency and the one or more attributes in accordance with the prioritization;

wherein when the velocity is within the second range, the computerized client device is configured to be more likely to switch from (i) a first connection to a first wireless network to (ii) a second connection to a second wireless network, than when the velocity is within the first range.

10. A computerized mobile device comprising:
processor apparatus; and
storage apparatus in data communication with the processor apparatus, the storage apparatus comprising at least one computer program configured to, when executed on the processor apparatus:
determine a mobility state of the computerized mobile device, the determination of the mobility state comprising:
a determination that the computerized mobile device is within a moving object; and
based at least on the determination that the computerized mobile device is within a moving object, a determination of (i) a duration of time that the computerized mobile device has been in a presence of one or more wireless networks, and (ii) a movement of the computerized mobile device relative to (a) the moving object, and (b) one or more prescribed reference network access points;
determine, based at least on the mobility state, at least one management decision relating to one or more connections between the computerized mobile device and the one or more wireless networks; and
manage the one or more connections in accordance with the at least one management decision.

11. A computerized method of operating a computerized client device, the computerized method comprising:
determining a mobility state of the computerized client device, the determining of the mobility state comprising:
determining that the computerized mobile device is on or within a moving object; and
determining: (i) a duration of time that the computerized client device has been in a presence of one or more wireless networks, and (ii) a movement of the computerized client device relative to (a) the moving object, and (b) one or more access point apparatus;
determining, based at least on the mobility state, at least one policy relating to one or more connections between the computerized client device and at least one of the one or more wireless networks; and
managing the one or more connections according to the at least one policy.

12. The computerized method of claim 11, further comprising:
identifying one or more prescribed data associated with the one or more connections between the computerized client device and at least one of the one or more wireless networks, the one or more prescribed data configured to cause the computerized client device to switch from one to another of the one or more wireless networks; and
assigning one or more weights, respectively, to the one or more prescribed data, to produce one or more weighted data;

wherein the determining of the at least one policy is further based on the one or more weighted data.

13. The computerized method of claim 11, wherein:
the determining of the mobility state further comprises determining a velocity of the computerized client device; and
the determining of the at least one policy further comprises determining, based at least on the velocity, a frequency at which to perform the managing of the one or more connections, the managing of the one or more connections relating to switching from a first connection to a first wireless network to a second connection to a second wireless network.

14. The computerized method of claim 13, further comprising determining that the velocity of the computerized client device is within a prescribed first range, the first range comprising greater velocity values than a prescribed second range;
wherein the managing of the one or more connections according to the at least one policy comprises causing severance of the first connection and causing creation of the second connection based at least on the determining that the velocity of the computerized client device is within the prescribed first range.

15. The computerized method of claim 11, wherein the determining of the at least one policy further comprises determining the at least one policy based on a duration that the computerized client device is in a presence of the one or more wireless networks.

16. The computerized method of claim 11, wherein the determining of the at least one policy further comprises determining the at least one policy based on stored data, the stored data identifying the one or more wireless networks as being maintained by the one or more access point apparatus.

17. The computerized method of claim 11, further comprising:
the determining of the mobility state further comprises determining a velocity of the computerized client device;
based at least on the velocity being below a prescribed threshold, scanning at a prescribed frequency for other wireless networks while maintaining the one or more connections between the computerized client device and the one or more wireless networks.

18. The computerized method of claim 11, wherein the determining of the at least one policy is comprises determining the a least one policy further based on one or more attributes relating to at least one of the computerized client device or the one or more wireless networks.

19. The computerized method of claim 18, further comprising monitoring data representative of the one or more attributes, the one or more attributes comprising at least one of: network signal strength, device network preference, network signal-to-noise ratio (SNR), or network signal band.

20. The computerized method of claim 11, wherein the determining of the mobility state further comprises conducting one or more global positioning system (GPS) readings.

21. Computer readable apparatus comprising: a non-transitory storage medium, the non-transitory storage medium comprising at least one computer program having a plurality of instructions, the plurality of instructions configured to, when executed on a digital processing apparatus:
determine a mobility state of a computerized client device;
obtain data representative of one or more attributes relating to at least one of the computerized client device, or at least one wireless network;

implement a plurality of voting modules, each of the plurality of voting modules configured to evaluate the data relative to a predefined baseline, and issue a vote relating to whether to effect a connection of the computerized client device to the at least one wireless network; and based at least on the mobility state and the respective votes from the plurality of voting modules, cause the computerized client device to effect the connection.

22. A computerized method for operating a computerized client device in data communication with a first wireless network, the computerized method comprising:

determining a mobility state of the computerized client device, the mobility state being based, at least in part, on a velocity of the computerized client device;

determining, based at least on the velocity, a frequency at which to make network connection decisions, the network connection decisions relating to switching from the first wireless network to at least one second wireless network;

identifying one or more attributes associated with at least one of (i) the computerized client device, (ii) the first wireless network, (iii) the second wireless network, or (iv) a first connection between the computerized client device and the first wireless network; and based at least on the mobility state, the frequency, and the identified one or more attributes, and when the velocity is within a first prescribed range of values, causing (i) severance of the first connection and (ii) creation of a second connection to the at least one second wireless network.

23. The computerized method of claim 22, further comprising assigning one or more weighted values, respectively, to the identified one or more attributes;
wherein the one or more weighted values are based on preference of a user of the computerized client device.

24. The computerized method of claim 22, further comprising storing data representative of the identified one or more attributes over a prescriber period of time, the identified one or more attributes comprising at least one of: network signal strength, device network preference, network signal-to-noise ratio (SNR), or network signal frequency band.

25. The computerized method of claim 22, wherein:
the determining of the mobility state comprises determining that the computerized mobile device is on or within a moving object; and
the determining of the velocity comprises determining the velocity of the computerized client device relative to one or more access point apparatus on or within the moving object.

26. The computerized method of claim 22, further comprising:
storing data representative of respective identities of a plurality of wireless networks, the plurality of wireless networks comprising the first and the at least one second wireless network; and
associating the respective identities of the plurality of wireless networks with a respective prescribed range of values relating to velocity, the respective prescribed range comprising at least the first prescribed range;
wherein the effecting of the one of the network connection decisions is further based on the associating.

* * * * *